(12) United States Patent
Augis

(10) Patent No.: US 6,802,678 B2
(45) Date of Patent: Oct. 12, 2004

(54) TAPPING UNIT

(75) Inventor: Jean-Noël Augis, Cluses (FR)

(73) Assignee: Pronic, Marignier (FR)

( * ) Notice: Subject to any disclaimer, the term of this patent is extended or adjusted under 35 U.S.C. 154(b) by 269 days.

(21) Appl. No.: 10/055,763

(22) Filed: Jan. 23, 2002

(65) Prior Publication Data
US 2002/0102142 A1 Aug. 1, 2002

(30) Foreign Application Priority Data
Jan. 30, 2001 (FR) .............................. 01 01534

(51) Int. Cl.⁷ ................................. B23B 47/00
(52) U.S. Cl. .................. 408/137; 408/127; 408/138; 470/183
(58) Field of Search ............... 279/16; 408/101, 408/102, 124, 127, 137, 138; 470/103, 181, 183, 207

(56) References Cited

U.S. PATENT DOCUMENTS 2,770,821 A * 11/1956 Adlaf ........................ 408/138
3,945,751 A * 3/1976 Johnson ..................... 408/127
4,021,133 A * 5/1977 Ebert ........................ 408/141
4,050,835 A * 9/1977 Womack ..................... 408/11
4,115,025 A * 9/1978 Petroff ........................ 408/6
4,269,421 A * 5/1981 Wawrzyniak ................ 279/16
4,288,183 A * 9/1981 Kato .......................... 408/142
5,342,069 A * 8/1994 Wellach ...................... 279/16
5,639,191 A * 6/1997 Womack ..................... 408/1 R

FOREIGN PATENT DOCUMENTS

| DE | 19729263 | 1/1999 |
| EP | 0999006 | 5/2000 |
| GB | 1369208 | 10/1974 |
| GB | 1391176 | 4/1975 |

* cited by examiner

Primary Examiner—Daniel W. Howell
(74) Attorney, Agent, or Firm—William H. Eilberg

(57) ABSTRACT

In a tapping unit according to the invention, the tap is held in a tap-carrier which is screwed into a pattern retained and fixed against rotation in a casing. The tap, the tap-carrier and the pattern form a subassembly mobile with limited amplitude in axial translation and radial displacement inside the casing, so that the tap can follow unwanted movements of the part being tapped.

10 Claims, 5 Drawing Sheets

TAPPING UNIT

The present invention relates to tapping units intended to be mounted on a machine tool. The invention relates in particular to tapping units that can be used on a machine tool performing one or more machining operations on parts continuously.

For example, this kind of tapping unit can be used on a part-forming press to produce one or more threads on a part.

Taps for cutting threads on a press are already known in the art. For example, the document EP 0 999 006 describes a tap of the above kind including a casing intended to be fixed opposite a part to be tapped on a machine tool such as a press. The casing includes an interior housing which accommodates a pattern in the form of a bush with a tapped bore prevented from rotating. The pattern receives in its bore a tap-carrier which itself includes means for receiving and retaining a tap. The tap-carrier has a threaded section functionally engaged in the tapped bore of the pattern. The tap-carrier has a proximal driving section with a polygonal cross section which slides in a bore with a polygonal cross section in a drive shaft rotatably mounted in the casing. The drive shaft is rotated by a mechanical transmission driven by a motor.

The mechanical transmission includes a flexible shaft that connects the mobile members of the casing to a remotely sited motor.

The casing is mounted on the part-carrier of the machine with elastic means between them such as blocks of elastic material. The blocks of elastic material must nevertheless have sufficient stiffness to position the tap correctly at the start of machining. This reduces the possibilities for radial and axial displacement of the tap and unwanted movements of the part during machining generate relatively high forces on the tap during tapping, and so compromise the quality of the tapping effected, reduce the service life of the taps, and introduce the risk of the tap-carrier loosening.

What is more, the flexible drive shaft applies a non-negligible force or torque to the casing, modifying its position and thereby affecting the position of the tap at the start of machining. This necessitates a further increase in the stiffness of the blocks of elastic material joining the casing and the part-carrier of the machine, so compromising the freedom of movement of the tap.

The tapping head formed by the casing and the parts that it contains has a relatively high inertia, which reduces the capacity for fast movement of the tap relative to the part to be machined during tapping.

These drawbacks are more serious when tapping small diameters.

The document DE 197 29 263 A describes a tapping unit including at the same time means allowing slight and limited radial movement of the tap in the casing around a mean radial position, and means allowing limited retrograde axial movement of the tap toward the inside of the casing from a reference position and against the action of return spring means. To this end, the tap is mounted in a clamping bush which is mounted with some radial clearance in an operating shaft whose central portion is coupled to a conical drive wheel and whose proximal portion is threaded to engage in the tapped bore of a pattern which is mounted to slide axially in the casing and pushed forward by a spring so that it abuts against a shoulder of the casing.

In the normal tapping position, the pattern bears against the shoulder of the casing and on the one hand the tap can therefore oscillate radially with the bush, and can retract toward the interior of the casing, against the thrust of the spring. On the other hand, the tap cannot move in the direction toward the exterior of the casing.

The above device is known to facilitate engaging the tap in a preliminary hole in the part to be tapped, and to allow retrograde movement of the tap if there is no such hole or if the hole is offset too far.

However, the above device is not designed to follow unwanted movements of the parts to be machined during mass production tapping, and there is then a tendency for defective tapping, reduced tap service life, and loosening of the tap-carriers.

The problem addressed by the present invention is to improve the quality of the tapping effected by tapping units mounted on a machine tool such as a press. The invention stems from the observation that tapping defects are generated by unwanted movements of the part to be machined on the part-carrier, which movements induce non-negligible forces between the part to be machined and the tap. On mass production machine tools, the parts to be machined are pressed onto the part-carrier by appropriate retaining means, but are not retained with a constant and permanent pressure, in particular at the start of tapping. There are therefore unwanted movements in the direction of separation of the part from the casing of the tapping unit. These movements, although of very limited amplitude, are inevitable and frequent, and are related to the kinematics of the cutting tools. It appears that these unwanted separation movements significantly impact on the service life of the tap, the quality of tapping, and how effectively the tap is clamped in the tap-carrier.

The basic idea of the invention is to enable limited forward movements of the tap out of the tapping head casing, the casing being rigidly fixed to the support of the machine, so that the tap can freely follow the frequent unwanted movements of the part to be tapped. What is more, the moving parts constitute a subassembly of low mass and low inertia, capable of following fast unwanted movements of the part to be machined relative to the part-carrier.

Accordingly, the invention provides a tapping unit including:

a casing adapted to be fixed facing a part to be machined on a support of a machine tool such as a press and having an interior housing.

a pattern, including a bush with a tapped bore, inserted axially in the interior housing of the casing and prevented from rotating by immobilizing means.

a tap-carrier, including means for receiving and retaining a tap, having a threaded section functionally engaged in the tapped bore of the pattern, and having a drive section, a drive shaft, rotatably mounted in the casing, having a bore receiving the drive section of the tap-carrier, which is adapted to slide longitudinally in it, and driven in rotation by a mechanical transmission driven by a motor.

means for allowing slight and limited radial movement of the tap in the casing about a mean radial position, means for allowing limited axial forward movement of the tap toward the exterior of the casing from a reference position and against the action of advance return spring means.

In a practical embodiment, the means for allowing limited axial forward movement of the tap include:

an axial bore in the casing in which the pattern can slide longitudinally between the reference position and a retracted proximal position.

a posterior distal shoulder in said axial bore in the casing.

an anterior distal shoulder on the pattern, facing the posterior distal shoulder in the bore, with an appropriate axial distance between said shoulders when the pattern is in a reference position.

an advance return spring means comprising an advance return spring inserted in the axial bore in the casing between the anterior distal shoulder of the pattern and the posterior distal shoulder of the bore in order to push the pattern axially back in the retraction direction.

The unit preferably further includes return radial spring means for returning the tap-carrier to a centered radial position in the casing.

In a simplified embodiment, the means allowing slight and limited radial displacement of the tap in the casing include:

the fact that the drive section is a proximal section of the tap-carrier, the fact that the tap is held fixedly in the tap-carrier, a slight radial clearance between the polygonal cross section bore in the drive shaft and the proximal drive section of the tap-carrier, an appropriate radial clearance between the pattern and the axial bore in the casing that guides it laterally, so that the tap-carrier, the tap and the pattern form an autonomous subassembly able to move in the fixed casing with a slight and conical oscillatory movement.

To increase further the capacity to absorb unwanted movements of the part to be machined, the tapping unit according to the invention preferably further includes means for allowing limited axial retrograde movement of the tap toward the interior, of the casing from the reference position, and a retraction return spring which pushes the pattern axially in the forward direction.

In a practical embodiment, the means for allowing limited axial retrograde movement of the tap include:

a proximal posterior shoulder on said axial bore in the casing, a corresponding proximal posterior shoulder on the pattern, said retraction return spring, inserted in the interior housing of the casing between the proximal posterior shoulder of the pattern and a front bearing surface of the casing, in order to push the pattern axially in the forward direction, the thrust of the retraction return spring being inhibited by the proximal posterior shoulder of the axial bore in the casing when the pattern is at or downstream of its reference position.

Sealing means are preferably disposed between the pattern and the tap-carrier at the distal outlet of the bore in the pattern, in order to oppose polluting fluids reaching the co-operating threads of the tapped bore in the pattern and the threaded section of the tap-carrier.

In another aspect, the invention provides a press for forming and machining parts, characterized in that it includes a tapping unit as defined hereinabove, the casing of the tapping unit being fixed to the part-carrier of the press with the tap facing toward the part to be machined, so that the freedom of radial and axial movement of the tap allows it to follow unwanted movements of the part to be machined on the part-carrier during tapping.

Other objects, features and advantages of the present invention will emerge from the following description of particular embodiments, which description is given with reference to the accompanying drawings, in which.

Figure 1:
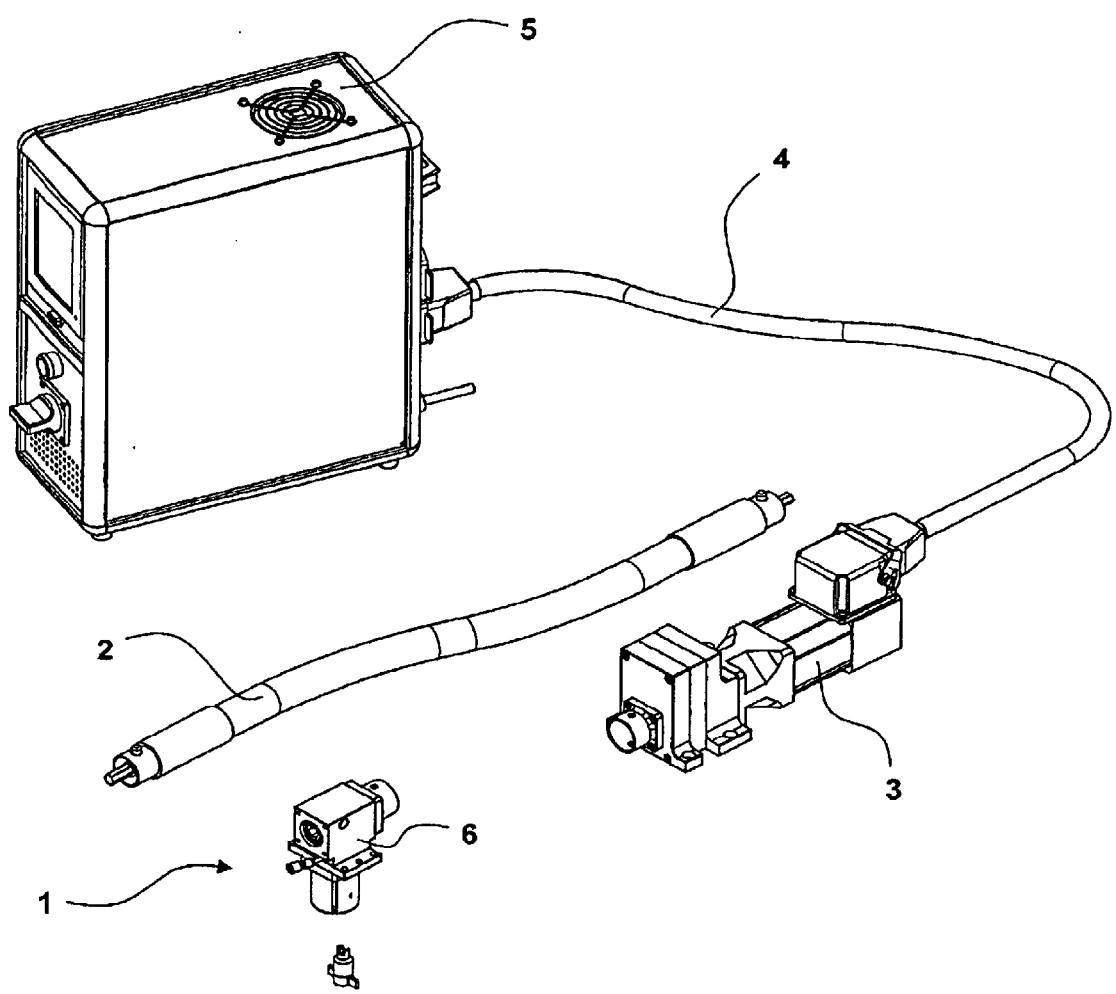
FIG. 1 is a diagrammatic perspective view of one embodiment of a tapping unit in accordance with the present invention.

In the embodiment shown in FIG. 1, a tapping unit generally includes a tapping head 1 connected by a flexible drive shaft 2 to a motor 3 itself supplied with electrical energy via a cable 4 from a power supply 5 included in a control box.

In the usual way, the tapping head 1 includes a 90° direction-changer within a casing 6 designed to be fixed to a support of a machine tool such as a press, opposite a part to be tapped.

Figure 2:
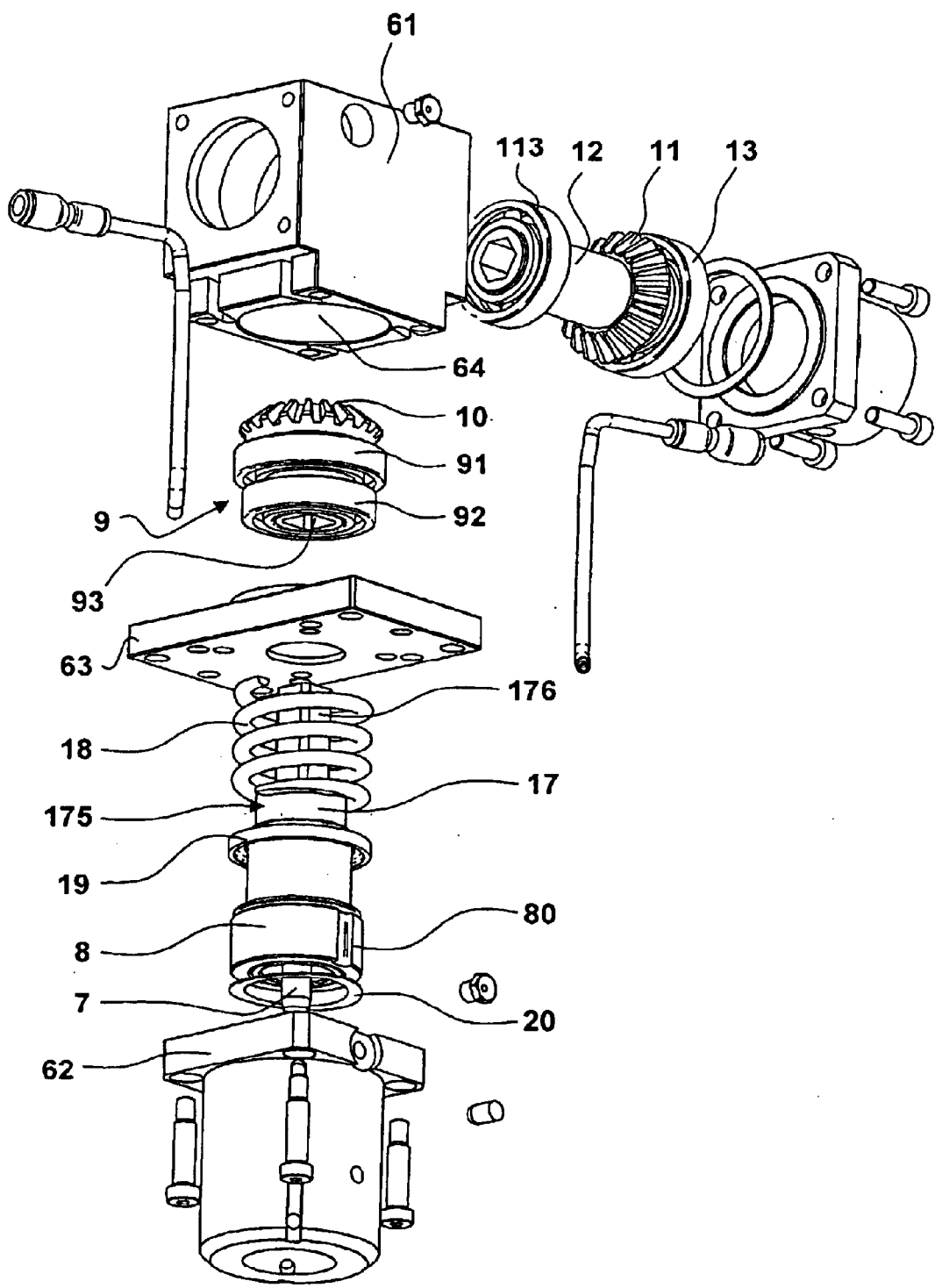
FIG. 2 is an exploded perspective view of an advantageous embodiment of a tapping head structure in accordance with the present invention.
Figure 3:
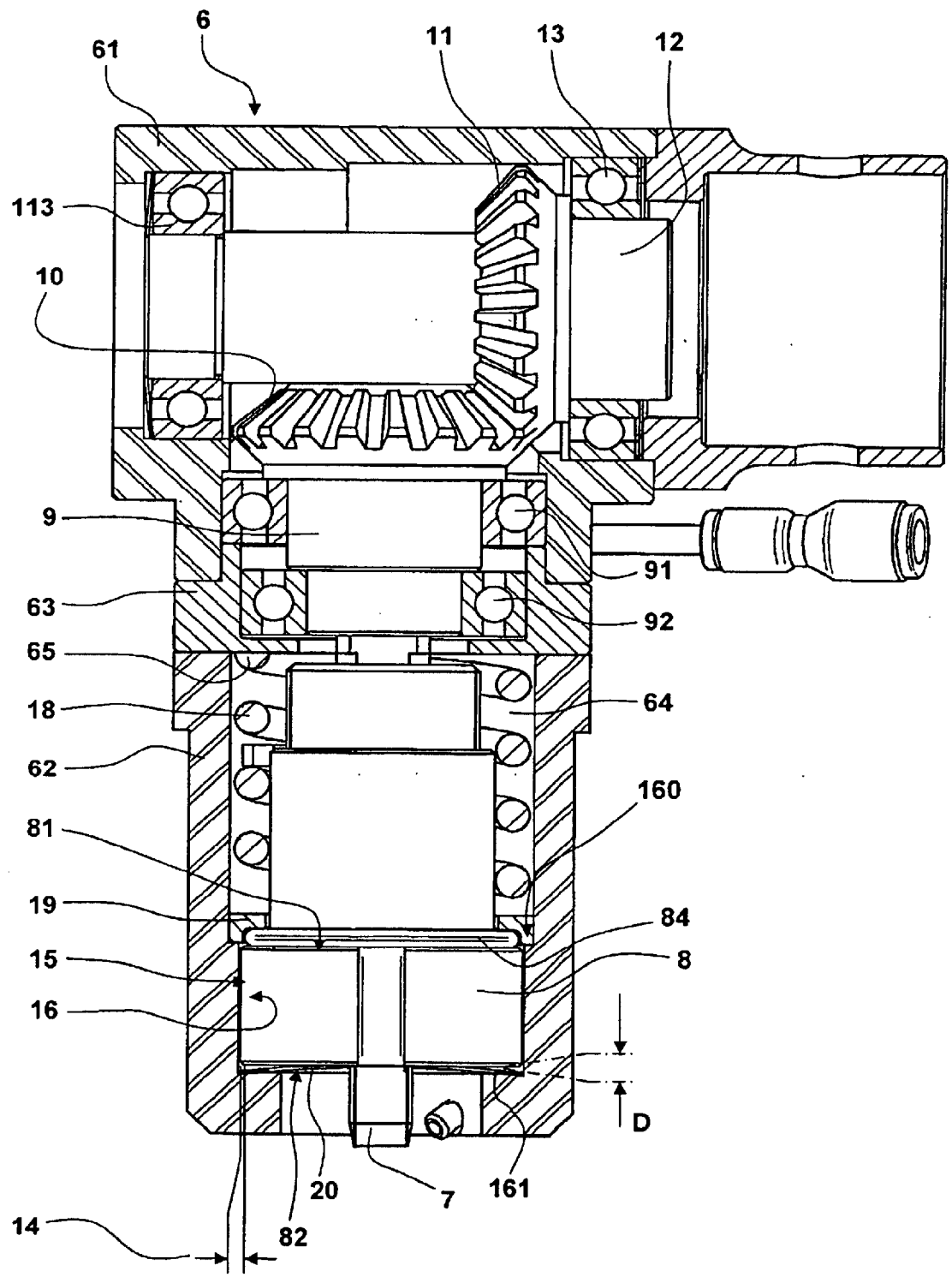
FIG. 3 is a side view in longitudinal section of the tapping head shown in FIG. 2.

FIGS. 2 and 3 show the general structure of one embodiment of a tapping head in accordance with the present invention. In this embodiment, the casing 6 is formed by assembling a proximal casing portion 61, a distal casing portion 62 and an intermediate connecting plate 63.

The casing 6 includes an interior housing 64 conformed to receive and retain the moving parts for holding and driving rotation of a tap 7.

The casing 6 contains a pattern 8 inserted axially into the interior housing 64 of the casing 6 and prevented from rotating by immobilizing means such as a key engaged in a peripheral groove 80. A drive shaft 9 is rotatably mounted in the casing 6. The rotation of the drive shaft 9 is driven by a mechanical transmission driven by a motor. In the embodiment shown, the drive shaft 9, which is rotatable about the axis of the tap 7, carries a driven conical gear 10 meshing with a driving conical gear 11 which is itself mounted on a drive shaft 12 journaled in the casing 6 by means of an upstream ball bearing 13 and a downstream ball bearing 113. The drive shaft 12 can be coupled to the motor 3 (FIG. 1) by the flexible drive shaft 2.

The drive shaft 9 (FIG. 3) is retained in the casing 6 by two bearings 91 and 92 which guide its rotation and prevent it from moving axially.

As can be seen in FIG. 3, the pattern 8 is mounted with an appropriate radial clearance 14 between its peripheral surface 15 and the bore 16 of the casing 6 that guides it laterally.

Simultaneously, the pattern 8 is urged into a centered radial position in the casing 6 by an elastic material O-ring 84 inserted radially between the peripheral cylindrical surface of the pattern 8 and the ring 19 mounted in the interior housing 64 of the casing 6. The O-ring 84 constitutes return radial spring means for urging the tap-carrier 17 toward a centered radial position in the casing 6. This improves the capacity of the tap 7 to engage in a preliminary hole in the part to be tapped when starting tapping, even if the preliminary hole is slightly off-centered, and whatever the direction of this off-centering may be.

Figure 4:
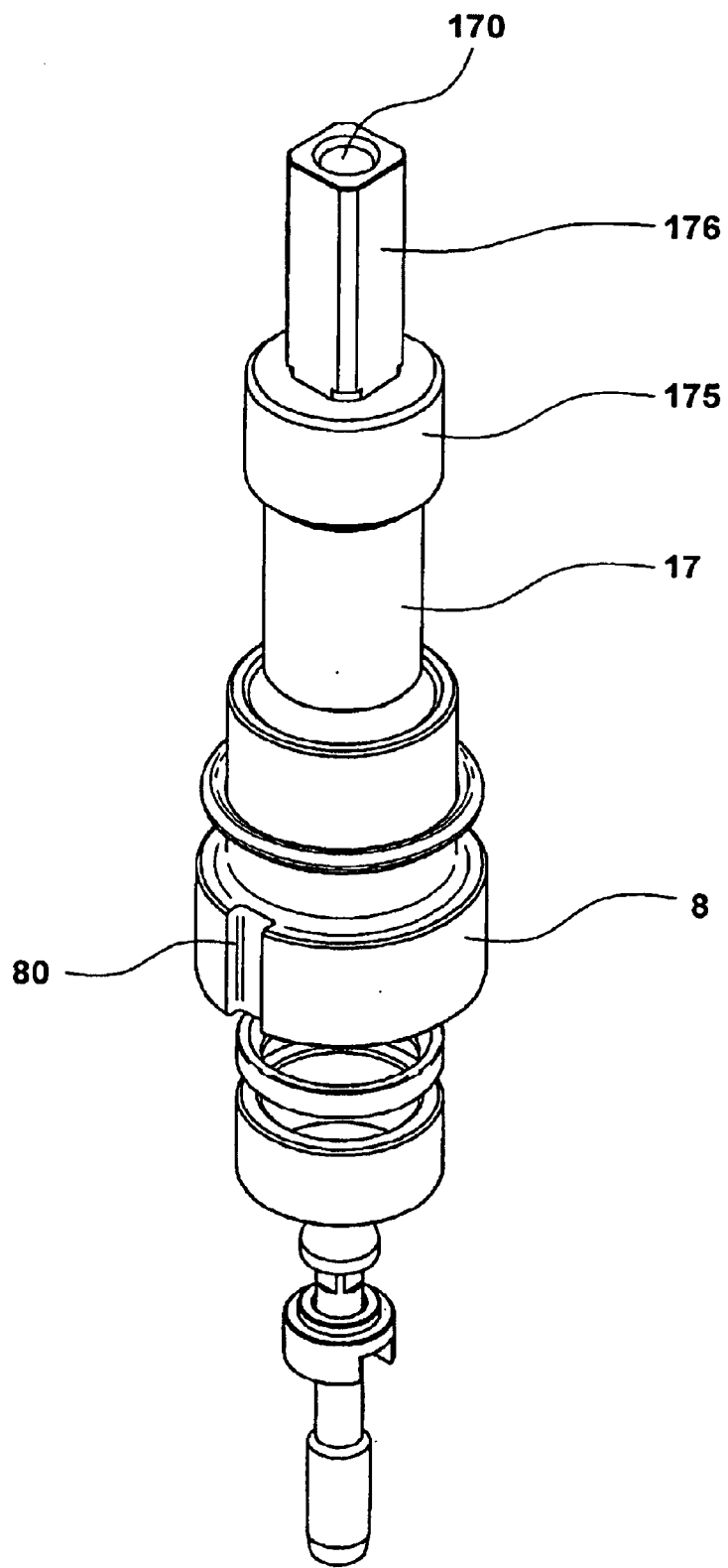
FIG. 4 is an exploded perspective view of the mobile interior assembly of the tapping head shown in FIGS. 2 and 3, showing the tap, the tap-carrier and the pattern.
Figure 5:
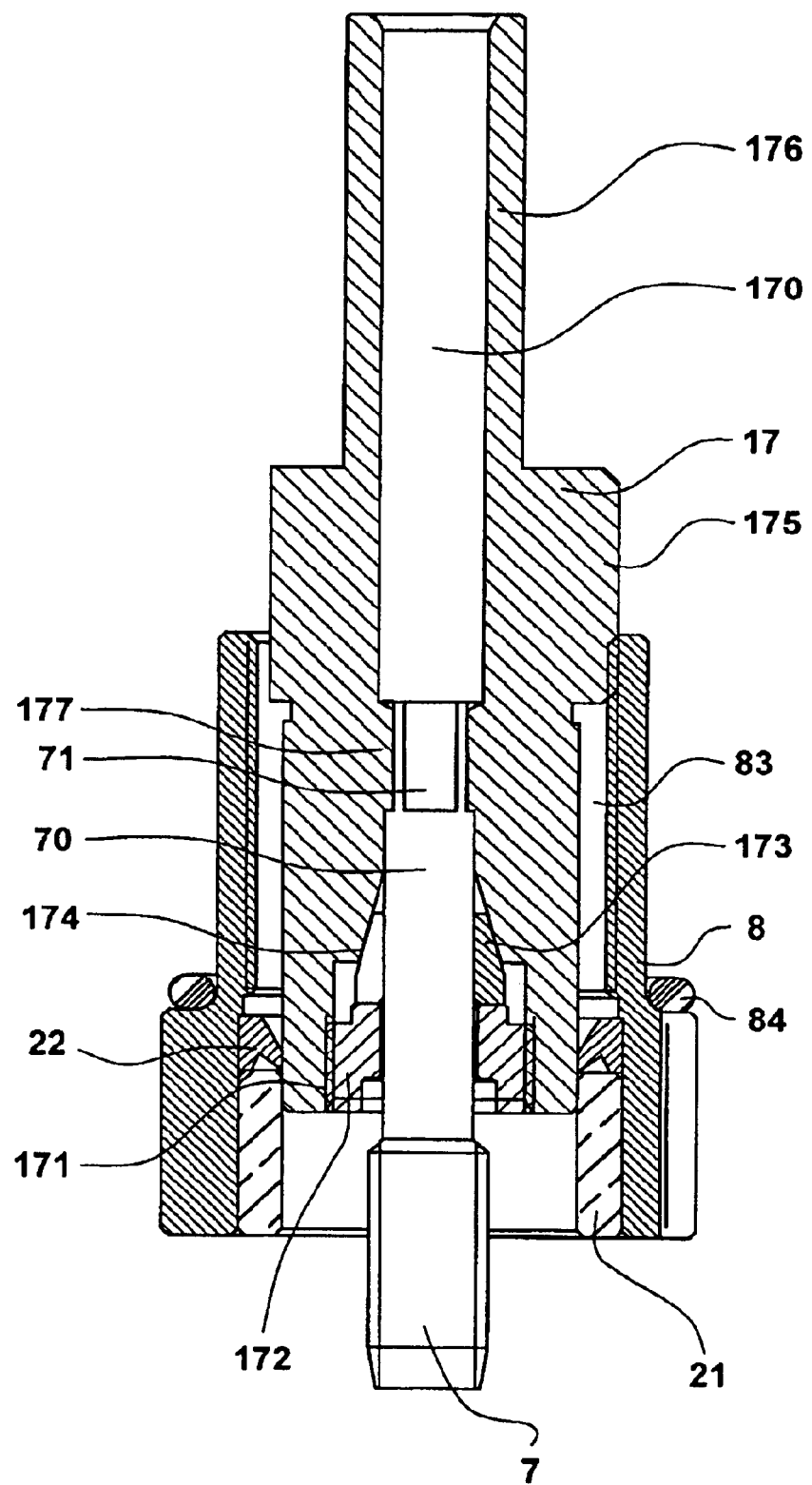
FIG. 5 is a side view in longitudinal section of the assembled mobile assembly shown in FIG. 4.

Refer now to FIGS. 4 and 5, which show in more detail the parts constituting the mobile components of the tapping head. Shown again here is the pattern 8, which takes the form of a bush with a tapped bore 83. A tap-carrier 17 includes means for receiving and retaining the tap 7. In the example shown, the tap-carrier 17 includes an interior bore 170 conformed to receive slidingly the stem 70 of the tap 7. The distal end of the tap-carrier 17 has a tapped interior bore section 171 which receives a clamping nut 172 which itself bears against a conical clamping split ring 173 inserted in a conical portion 174 of the tap-carrier 17. By tightening the clamping nut 172 in the tapped interior bore section 171, the clamping nut 172 pushes the split clamping conical ring 173 into the conical portion 174, reducing the diameter of the split clamping conical ring 173, which therefore grips the rod 70 of the tap 7 to hold it fixedly in the tap-carrier 17.

To improve the rotational coupling of the tap 7 to the tap-carrier 17, the interior bore 170 of the tap-carrier 17 has an intermediate section 177 with a polygonal cross section, for example a square cross section, to receive the end section 71 of the rod 70 of the tap 7, the end section 71 itself having a corresponding polygonal section in order to couple the tap 7 rotationally to the tap-carrier 17.

The tap-carrier 17 has a threaded section 175 functionally inserted in the tapped bore 83 of the pattern 8, and a proximal drive section 176 with a polygonal cross section, for example a square cross section, as shown in FIG. 4 or FIG. 2. Referring to FIG. 2, it can be seen that the proximal drive section 176 of the tap-carrier 17 is engaged in and can slide longitudinally in a corresponding polygonal cross section bore 93 in the drive shaft 9 in order to couple the tap-carrier 17 rotationally to the drive shaft 9.

During tapping, the pattern 8 is initially in a reference position, and the tap-carrier is in a retracted initial position shown in FIG. 5. Through the flexible drive shaft 2 and the conical gears 10 and 11, rotation of the motor 3 drives rotation of the drive shaft 9 which in turn drives rotation of the tap-carrier 17. As it rotates, the tap-carrier 17 moves helicoidally because its threaded section 175 is screwed into the tapped bore 83 of the pattern 8, causing helicoidal movement of the tap 7.

There is a small radial clearance between the polygonal cross section bore 93 of the drive shaft 9 and the proximal drive section 176 of the tap-carrier 17. This can be the functional clearance that is usually provided between two sliding parts, and which is smaller than the appropriate radial clearance 14 between the pattern 8 and the bore 16 in the casing 6.

By combining this small radial clearance with the appropriate radial clearance 14 between the pattern 8 and the bore 16 in the casing 6, slight conical oscillation is allowed of the combination formed by the tap-carrier 17, the tap 7 and the pattern 8, therefore allowing slight and limited radial movement of the tap 7 in the casing 6 around a mean radial position. The conical oscillation of the combination of the tap-carrier 17, the tap 7 and the pattern 8 around a proximal center located at the level of the drive shaft 9 increases the capacity for radial oscillation of the tap 7: the radial oscillation of the tap 7 is greater than the appropriate radial clearance 14.

The tap-carrier 17, the tap 7 and the pattern 8 thus form an autonomous subassembly which is mobile in the casing 6 and, as shown in FIG. 5, this subassembly can advantageously be an interchangeable subassembly that is fitted into the casing 6 and can be replaced by another subassembly, allowing easy tapping on different diameter holes.

Referring again to FIG. 3, there are shown means allowing limited axial retrograde movement of the tap 7 toward the interior of the casing 6 from a reference position and against the action of return spring means. In the embodiment shown, there is an axial bore 16 in the casing 6 in which the pattern 8 slides longitudinally between a reference or rest position shown in FIG. 3 and a retracted proximal position in which the pattern 8 is retracted or moved upward (see FIG. 3). The axial bore 16 in the casing 6 has a proximal posterior shoulder 160. The pattern 8 has a corresponding proximal posterior shoulder 81 at substantially the same axial location as the proximal posterior shoulder 160 of the axial bore 16 in the casing 6 when the pattern is in its reference position. A retraction return spring 18, for example a compression coil spring, is fitted around the pattern 8 in the interior housing 64 of the casing 6 between the proximal posterior shoulder 81 of the pattern 8 and a front bearing surface 65 of the casing 6, to push the pattern 8 axially in the forward direction, i.e. downward in FIG. 3. The thrust of the retraction return spring 18 is inhibited by the proximal posterior shoulder 160 of the axial bore 16 in the casing 6 when the pattern 8 is in its reference position, or beyond it in the downstream direction. It allows at the same time to determine an axial reference position of the pattern 8, and a return of the pattern 8 into a centered radial position under operation of the O-ring 84.

The thrust ring 19 is slidably engaged in the interior housing 64 of the casing 6 and around the pattern 8, between the distal end of the retraction return spring 18 and the respective posterior shoulders 81 and 160 of the pattern 8 and the axial bore 16 in the casing 6. In the reference position, the thrust ring 19 bears on the proximal posterior shoulder 160 of the axial bore 16 in the casing 6.

If axial thrust is applied to the tap 7 by the part to be machined in the direction causing the tap 7 to move into the casing 6, the pattern 8 can retract slightly, compressing the retraction return spring 18, and so preventing excessive forces from being applied to the tap 7.

FIG. 3 also shows an embodiment of the means allowing limited axial forward movement of the tap 7 toward the outside of the casing 6 from the reference position and against the action of advance return spring means. Said means include a distal posterior shoulder 161 in the axial bore 16 in the casing 6, and a distal anterior shoulder 82 of the pattern 8 which faces the distal posterior shoulder 161 in the bore. There is an appropriate axial distance D between the shoulders 161 and 82 when the pattern 8 is in its reference position. An advance return spring 20, for example a compression spring, is engaged around the pattern 8 in the axial bore 16 in the casing 6 between the anterior distal shoulder 82 of the pattern 8 and the posterior distal shoulder 161 of the bore, in order to push the pattern 8 axially back in the retraction direction. Accordingly, if the part to be machined is subjected to a slight movement away from the casing 6 during tapping, the tap 7 held by the tap-carrier and the pattern 8 can move forward slightly to follow the part to be machined by compressing the advance return spring 20. This can occur if tapping begins before the part to be machined is correctly pressed against the part-carrier, or before a part pressing device begins to operate, for example.

The advance return spring 20 can be a spring washer, for example.

Sealing means are disposed between the pattern 8 and the tap-carrier 17 at the distal outlet of the bore in the pattern, to prevent polluting fluids reaching the co-operating threads of the tapped bore 83 in the pattern and the threaded section 175 of the tap-carrier 17.

For example, in the embodiment shown, the sealing means include a bronze guide and sealing ring 21, fastened to the pattern 8, and surmounted by a lip seal 22 engaged between the bore in the pattern and the exterior surface of the tap-carrier 17.

According to the invention, the casing 6 is rigidly fixed to the part-carrier of the machine tool, such as a press, with the tap 7 facing toward the part to be machined. The freedom of the tap 7 carried by the tap carrier 17 and the pattern 8 to move axially and radially therefore allow them to follow the unwanted movements of the part to be machined on the part-carrier during tapping. The tap 7 is essentially guided by the thread that it cuts in the part to be machined.

In the embodiments described the mechanical drive is advantageously provided by a mechanical transmission including the flexible drive shaft 2 functionally connecting the remote motor 3 to the mobile members 7, 8, 17 of the casing 6.

The present invention is not limited to the embodiments explicitly described, but encompasses variations and generalizations thereof within the scope of the following claims.

There is claimed:

1. Tapping unit, including:
   a casing adapted to be fixed facing a part to be machined on a support of a machine tool and having an interior housing,
   a pattern including a bush with a tapped bore inserted axially in the interior housing of the casing and prevented from rotating by immobilizing means,
   a tap-carrier including means for receiving and retaining a tap, having a threaded section functionally engaged in the tapped bore of the pattern, and having a drive section,
   a drive shaft, rotatably mounted in the casing, having a bore receiving the drive section of the tap-carrier, which is adapted to slide longitudinally in it, and driven in rotation by a mechanical transmission driven by a motor,
   means which allow slight and limited radial movement of the tap in the casing about a mean radial position,
   and means which allow limited axial forward movement of the tap toward the exterior of the casing from a reference position and against the action of advance return spring means.

2. Tapping unit according to claim 1, wherein the means which allow limited axial forward movement of the tap include:
   an axial bore in the casing in which the pattern can slide longitudinally between the reference position and a retracted proximal position,
   a posterior distal shoulder in said axial bore in the casing,
   an anterior distal shoulder on the pattern, facing the posterior distal shoulder in the bore, with an appropriate axial distance between said shoulders when the pattern is in a reference position,
   said advance return spring means comprise an advance return spring inserted in the axial bore in the casing between the anterior distal shoulder of the pattern and the posterior distal shoulder of the bore in order to push the pattern axially back in the retraction direction.

3. Tapping unit according to claim 1, including return radial spring means which return the tap-carrier to a centered radial position in the casing.

4. Tapping unit according to claim 1, wherein the means which allow slight and limited radial displacement of the tap in the casing include:
   the fact that the drive section is a proximal section of the tap-carrier,
   the fact that the tap is held fixedly in the tap-carrier,
   a slight radial clearance between the polygonal cross section bore in the drive shaft and the proximal drive section of the tap-carrier,
   an appropriate radial clearance between the pattern and the axial bore in the casing that guides it laterally,
   so that the tap-carrier, the tap and the pattern form an autonomous subassembly able to move in the fixed casing with a slight and conical oscillatory movement.

5. Tapping unit according to claim 1, further including means which allow limited axial retrograde movement of the tap toward the interior of the casing from the reference position, and a retraction return spring which pushes the pattern axially in the forward direction.

6. Tapping unit according to claim 5, wherein the means which allow limited axial retrograde movement of the tap include:
   a proximal posterior shoulder on said axial bore of the casing,
   a corresponding proximal posterior shoulder on the pattern,
   said retraction return spring, inserted in the interior housing of the casing between the proximal posterior shoulder of the pattern and a front bearing surface of the casing, in order to push the pattern axially in the forward direction, the thrust of the retraction return spring being inhibited by the proximal posterior shoulder of the axial bore in the casing when the pattern is at or downstream of its reference position.

7. Tapping unit according to claim 6, wherein a thrust ring is slidably engaged in the interior housing of the casing and around the pattern, between the distal end of the retraction return spring and the respective posterior shoulders on the pattern and in the axial bore in the casing.

8. Tapping unit according to claim 1, including sealing means disposed between the pattern and the tap-carrier at the distal outlet of the bore in the pattern, in order to oppose polluting fluids reaching the cooperating threads of the tapped bore in the pattern and the threaded section of the tap-carrier.

9. Tapping unit according to claim 1, wherein the mechanical transmission includes a flexible drive shaft functionally connecting a remote motor to the mobile members of the casing.

10. Press for forming and machining parts, including a tapping unit comprising:
   a casing adapted to be fixed facing a part to be machined on a support of a machine tool and having an interior housing,
   a pattern including a bush with a tapped bore inserted axially in the interior housing of the casing and prevented from rotating by immobilizing means,
   a tap-carrier including means for receiving and retaining a tap, having a threaded section functionally engaged in the tapped bore of the pattern, and having a drive section,
   a drive shaft, rotatably mounted in the casing, having a bore receiving the drive section of the tap-carrier, which is adapted to slide longitudinally in it, and driven in rotation by a mechanical transmission driven by a motor,
   means which allow slight and limited radial movement of the tap in the casing about a mean radial position,
   and means which allow limited axial forward movement of the tap toward the exterior of the casing from a reference position and against the action of advance return spring means,
   the casing of the tapping unit being fixed to a part-carrier of the press with the tap facing toward the part to be machined, so that the freedom of radial and axial movement of the tap allows it to follow unwanted movements of the part to be machined on the part-carrier during tapping.

* * * * *